(12) United States Patent
Zahirovic et al.

(10) Patent No.: US 10,471,406 B2
(45) Date of Patent: Nov. 12, 2019

(54) FILTRATION TRAY FOR CATALYTIC CHEMICAL REACTOR

(71) Applicant: Haldor Topsøe A/S, Kgs. Lyngby (DK)

(72) Inventors: Emir Zahirovic, Copenhagen (DK); Klaus Risbjerg Jarlkov, Hårlev (DK); Roberta Cenni, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 8 days.

(21) Appl. No.: 15/540,852

(22) PCT Filed: Dec. 18, 2015

(86) PCT No.: PCT/EP2015/080405
§ 371 (c)(1),
(2) Date: Jun. 29, 2017

(87) PCT Pub. No.: WO2016/110394
PCT Pub. Date: Jul. 14, 2016

(65) Prior Publication Data
US 2018/0001288 A1    Jan. 4, 2018

(30) Foreign Application Priority Data

Jan. 5, 2015 (DK) .................. 2015 00004

(51) Int. Cl.
*B01J 8/00* (2006.01)
*C10G 49/00* (2006.01)
*B01D 21/00* (2006.01)
*B01J 8/04* (2006.01)
*C10G 31/09* (2006.01)
*B01D 21/30* (2006.01)
*B01J 8/08* (2006.01)

(52) U.S. Cl.
CPC .......... *B01J 8/0085* (2013.01); *B01D 21/003* (2013.01); *B01D 21/0012* (2013.01); *B01D 21/30* (2013.01); *B01J 8/0492* (2013.01); *B01J 8/08* (2013.01); *C10G 31/09* (2013.01); *C10G 49/002* (2013.01); *B01D 2201/30* (2013.01); *B01D 2201/48* (2013.01); *B01J 2208/00707* (2013.01); *B01J 2219/00247* (2013.01)

(58) Field of Classification Search
CPC .. B01D 21/0012; B01D 21/003; B01D 21/30; B01D 2201/30; B01D 2201/48; B01J 2208/00707; B01J 2219/00247; B01J 8/0085; B01J 8/0492; B01J 8/08; C10G 31/09; C10G 49/002
See application file for complete search history.

(56) References Cited

U.S. PATENT DOCUMENTS

| 3,146,189 | A | | 8/1964 | Kunreuther et al. |
| 3,888,633 | A | | 6/1975 | Grosboll et al. |
| 5,855,741 | A | * | 1/1999 | Koch ............ B01D 3/009 202/158 |
| 2009/0177023 | A1 | * | 7/2009 | Koudil ............ B01J 8/0085 585/800 |

FOREIGN PATENT DOCUMENTS

EP          0358923 A1    3/1990

* cited by examiner

*Primary Examiner* — Latosha Hines
(74) *Attorney, Agent, or Firm* — Blank Rome LLP

(57) ABSTRACT

A particle separation system for a catalytic chemical reactor.

11 Claims, 10 Drawing Sheets

FILTRATION TRAY FOR CATALYTIC CHEMICAL REACTOR

FIELD OF THE INVENTION

This invention relates to a chemical reactor with filtration tray. The reactor can be a down-flow gas and liquid catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Particle separation and classification are well explored needs of the chemical, pharmaceutical, mineral and food industries. While particle classification in industrial processes may be required to improve the quality of a certain product, particle separation may be necessary to purify a fluid stream or to avoid problems to process equipment.

Sometimes particles are intentionally present in the process stream. This is for example the case of heterogeneous catalysis in liquid phase. In other cases the presence of particles is unintentional. This is for example the case of some refineries streams like shale crudes, various intermediate process streams, or effluents from slurry bed reactors. Particles may have various origins: they may be part of the original feedstock and other reactant streams or they may be generated in and collected from process equipment, for example as erosion and corrosion products. Particles may have organic nature, like char, coke and gums, or inorganic nature, like salts, debris or corrosion and erosion as iron components, or debris of catalyst particles. Also, they may contain living impurities as bacteria. Shape and size may also vary greatly—from sphere to flakes, from millimeters to a few microns or less. If the particles are unwanted in the downstream process, a filter, or other suitable particle separation technology known in the art, removes large part of these particles prior to sensitive equipment. However, in certain processes, the problem may appear or become more severe over time, for example when erosion and corrosion are involved. Sometimes, installing a particle removing equipment as an independent unit operation prior to sensitive equipment is not possible in practice.

One specific example of problems generated by particles may be seen in hydroprocessing. The feed to a hydroprocessing reactor is sometimes laden with particles. When the feed is introduced into the reactor, most particles accumulate on the inert and/or on the catalyst packed beds, plugging the bed. The consequent rapid increase in pressure drop is responsible of increased power requirement for compression. When the pressure drop across the reactor exceeds the maximum pressure that the system may deliver, reactors require skimming of the affected layers of the packed bed to continue operations. A frequency of once every 5-6 months for skimming is not uncommon. Skimming at a frequency higher than the schedule of the regular turnaround may be a source of significant profitability loss for the unit and the refinery.

A characterization of the particles affecting a reacting system may not be available. In a hydroprocessing reactor, the type of particles depends upon the specific crude and/or process related issues (rust, salts, gums, etc.). On-stream collection of the particles is typically not available. Thus, particle characterization relies on post-mortem analyses. These are often affected by large uncertainties due to particle agglomeration and oxidation.

US2009177023 discloses a filtration tray for a fixed bed reactor with a co-current down-flow of gas and liquid. The device can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

US 20090177023 describes a device which can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

EP0358923 discloses a process and an apparatus for purifying a raw gas originating from the gasification of solids. In a process and apparatus for purifying raw gas from solids gasification, containing granular and dusty solids particles, a solution is to be found, by means of which solids particles of any size are largely removed from the raw gas before entry to downstream cooling devices. This is achieved when the raw gas is passed in a first purification stage from the gasification zone in a straight line in the direction of a gas-holding space, whereby the granular solids particles are precipitated at the bottom of the gas-holding space and then, in a second purification stage, the partially purified raw gas is laterally deflected from the gas-holding space and undergoes a change to a velocity reduced by a factor of at least 3 and, after a further gas deflection, is passed substantially in the vertical direction through a solids filter, where the dusty solids particles are removed from the raw gas.

In spite of the above mentioned known art, a need exists for a reactor with a particle separator to ensure prolonged effective operation of the reactor despite any particle impurities in the inlet fluid stream to the reactor.

SUMMARY OF THE INVENTION

The present invention describes a novel particle separation system that combines sedimentation with filtration. In particular, the system includes various filtration sections with overfill systems to maximize particle capture while keeping the pressure drop constant and limiting the liquid load across the system. With some modifications, the present invention may be used to selectively separate particles of certain shapes.

The filtration tray of this invention allows the gas to flow from the entry point, through slots, to downstream the filtering section, substantially unhindered by the filters.

According to this invention, the filtration tray comprises a number of basins for the collection of the liquid. Some basins are interconnected. One, several or all the walls of the basins are made of a filtering medium. The filtering medium may be composite. When the liquid pours in the one basin, initially the liquid will permeate through the fresh filtering medium. The liquid may permeate directly downstream the filtration tray, or to a new filtration basin. As the filtering medium in any of the basins progressively plugs by the accumulating particles, the liquid level raises and fresh sections of the filtering medium are exposed to the liquid stream.

A critical feature of the invention is that the basins walls function as overfill gates. When a filtering wall of a containing basins progressively plugs, the liquid level raises. Eventually the liquid level achieves the same height of the gate and liquid flows unhindered to a new basin. The open passage in connection with the overfill gates (slot) is designed such to create a certain pressure drop, which is the maximum pressure drop across the tray. This shall be higher than the sum of the pressure drops across all the fresh filtering sections that the liquid has to permeate through to flow downstream the filtration tray.

Initially, the liquid flows across one or several filtering wall and it is led downstream the filtration tray without accumulating in any basin. Concomitantly with the progressive plugging of the filtering media, the level of the liquid in the affected basin increases until the liquid raises above the overfill gate and spills into the adjacent basin. The process continues until the last basin is filled and the liquid spills over the last gate and downstream the filtration tray. Thereby, the maximum pressure drop across the filtration tray has a limit.

The use of overfill gates to offer new filtration sections to the process allows to limit the total height of the liquid column on the tray. This feature is important as tall liquid columns in such a system have a few drawbacks:

a) They are heavy. Designing the tray to withstand big weights adds design complication and material. Consequently, the cost of the tray increases;

b) Tall liquid columns occupy a tall section of the reactor space. Normally, as much as possible of the reactor space is needed for the reactions and it is occupied by the catalyst. Reducing the space available for the catalyst typically implies shorter cycle lengths at a given product quality.

The gas flows directly from the entry point to the last slot and exits the filtration tray together with the liquid. The last slot is retrofitted with a technology for the dispersion of the liquid and gas throughout all the catalyst/grading surface.

The method of this invention includes at least one basin for the sedimentation of large and heavy scale particles prior to the filtration basins.

Prior sedimentation is necessary to avoid that scale particles with a large surface quickly plug the filters.

Depending upon the characteristics of the scale particles, the filtering media may be composite. One method to manufacture the filtering media is for example to construct a crate with at least two walls made of a screen type material, like wired mesh, printed pattern, or others, and to fill it with catalyst or inert particles. The use of catalyst material is interesting in certain embodiments, where the filtration tray may be used to favor certain chemical reactions. The screen material has to be fine enough to prevent the catalyst or inert material to exit the crate and large enough to allow the passage of the liquid through it. In the simplest construction method of the filtration tray, the two screens face each other and are perpendicular to the flow. There are however embodiments where the geometries are arranged differently and include angles towards the liquid flow or the options that the screens do not face each other. As the catalyst or inert shall be changed after each cycle, the crates have at least one removable side. In one embodiment, the removable side is perpendicular to the flow. By this method, the inert and/or catalyst material that fill the crate may be layered in layers of various types. In certain systems, this feature is beneficial to improve the effectiveness of separation without excessive increase of pressure drop. The removable side of the crate can be conveniently fixed and fastened to the crate by means of quick releases, which are systems for fixing and fastening that can be opened and closed in minutes and without the use of tools.

The invention can be performed with filtering media of different type and nature. For example they can be made of porous monolithic structures that may be composite.

The slot that allows the gas and liquid to flow downstream are retrofitted with a dispersion system that allows the mixture to spread uniformly on the downstream packed bed without the need of an additional distribution tray.

FEATURES OF THE INVENTION

1. A particle separation system for a catalytic chemical reactor, wherein the particle separation system comprises a plurality of filtration sections comprising overfill systems, thereby enabling particle capture while keeping the pressure drop over the separation system constant and limiting the liquid load across the system, wherein the particle separation system comprises at least one filtration tray comprising a number of basins with basin walls for collection of liquid, thereby combining sedimentation and filtration.

2. A particle separation system according to feature 1, wherein a plurality of the basins are interconnected in series of upstream and downstream basins.

3. A particle separation system according to any of the preceding features, wherein at least one of said basin walls comprises a filtering medium.

4. A particle separation system according to feature 3, wherein said filtering medium comprises a composite.

5. A particle separation system according to any of the features 3-4, wherein an upstream basin is enabled to let liquid permeate through the filtering medium either downstream the filtration tray or to a downstream basin until said filtering medium is plugged by accumulating particles.

6. A particle separation system according to any of the features 3-5, wherein the liquid level of an upstream basin rises when the filtering medium of said tray progressively plugs, thereby exposing downstream basins to the liquid stream, whereby the basin walls function as overfill gates.

7. A particle separation system according to feature 6, wherein an open passage downstream the overfill gate is adapted to have a pressure drop which is higher than the sum of the pressure drops of all serially interconnected basins with unplugged filtering medium in a filtration tray.

8. A particle separation system according to any of the preceding features, further comprising at least one initial sedimentation basin upstream the trays for large and heavy scale particles.

9. A particle separation system according to any of the preceding features, wherein the trays are constructed as crates comprising at least two walls made of a screen type material.

10. A particle separation system according to feature 9, wherein the screen type material comprises catalyst or inert material, or catalyst and inert material.

11. A particle separation system according to feature 10, wherein the screen type material is adapted to allow passage of liquid, while preventing the catalyst or inert material to pass through it.

12. A particle separation system according to any of the features 9-11, wherein the two screens face each other and are oriented perpendicular to a fluid flow.

13. A particle separation system according to any of the features 9-12, wherein the crates have at least one removable side for service.

14. A particle separation system according to feature 13, wherein the removable side is fastened by means of quick releases.

15. Use of a particle separation system according to any of the preceding features for hydroprocessing.

BRIEF DESCRIPTION OF THE DRAWINGS

The invention is further illustrated by the accompanying drawings showing examples of embodiments of the invention.

POSITION NUMBERS

Figure 1:
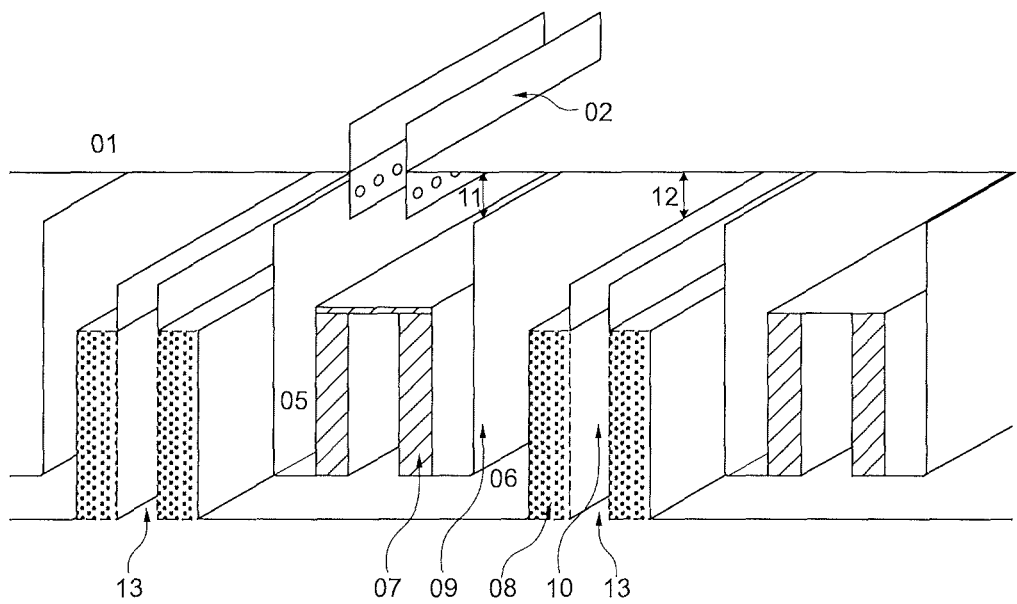
FIG. 1 shows a schematic drawing of the assembly.
Figure 2:
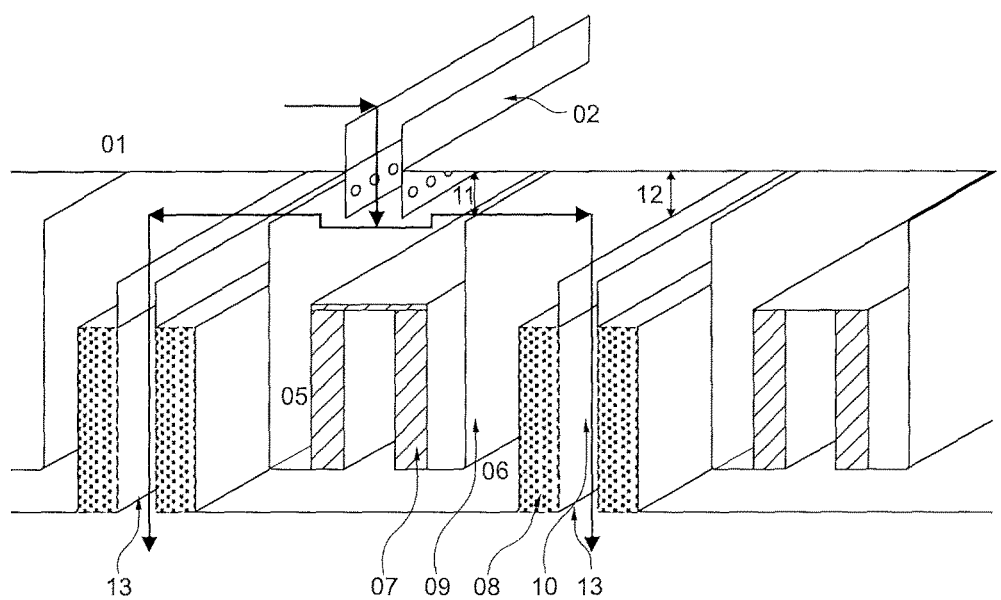
FIG. 2 shows the path of the gas throughout the all cycle length of the filtration tray. Substantially all gas separates from the mixture and, passing from slot 1 (11) and slot 2 (12), reaches downstream through the exit channel (13). Slot 1 and slot 2 are dimensioned such to define a certain pressure drop in the filtration basins. The design pressure drop depends upon the physical properties of the liquid; the mechanical properties of the filtering media 1 (07) and 2 (08) (including porosity and thickness); the size and other characteristics of the scale particles to be separated, the height of the overfill gate 1 (09) and gate 2 (10)
Figure 3:
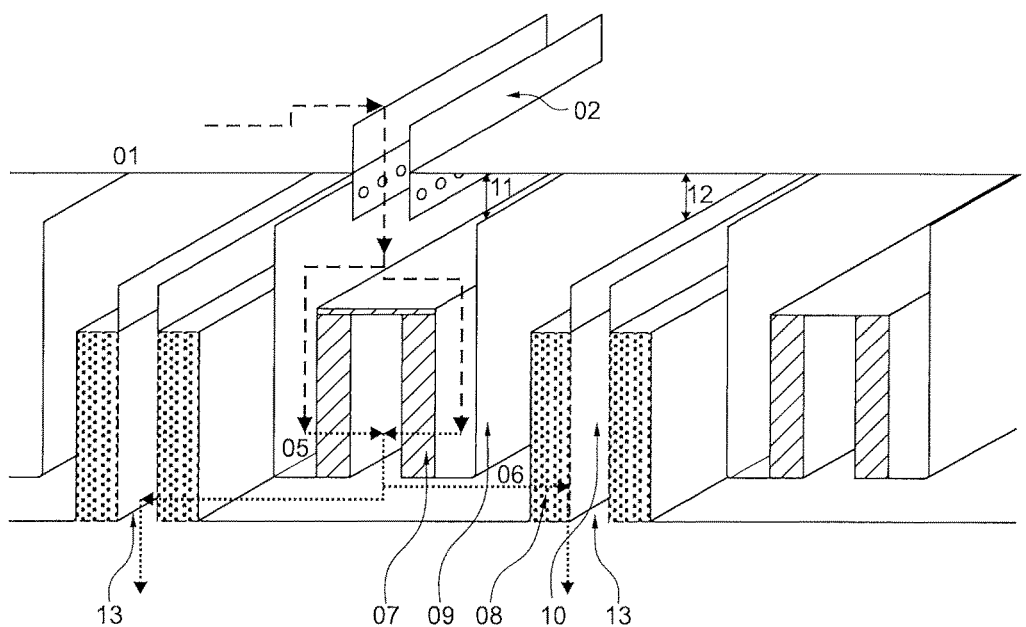
FIG. 3 shows the path of the liquid at time 0. Substantially all liquid is separated from the mixture upon pouring on the sedimentation basin 1 (01). The coarser scale particles stay on the sedimentation basin, while the liquid carrying the fine particles flows over the overfill gate (02) into the filtration basin 1 (05). The liquid permeates across the filtration medium 1 (07), which separates the fine particles, and flows into the filtration basin 2 (06). The liquid flows across the filtration medium 2 (08), which in this case does not perform any substantial action, since most of the particles were separated in the filtration medium 1. The liquid flows through the exit channel downstream.
Figure 4:
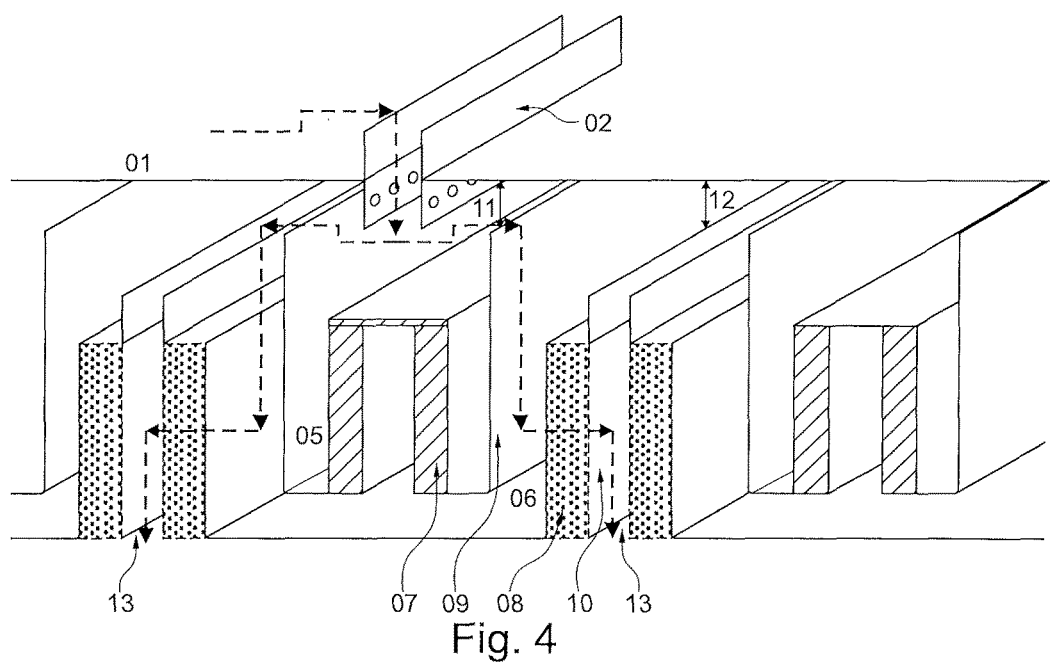
FIG. 4 shows the path of the liquid when the particle collecting capacity of the filtering medium 1 (07) is exhausted. The liquid level raises above the overfill gate 1 (09) and escapes through the slot 1 (11). The liquid pours into the filtration basin 2 (06), and it permeates through the filtration medium 2 (08). The liquid flows through the exit channel downstream.
Figure 5:
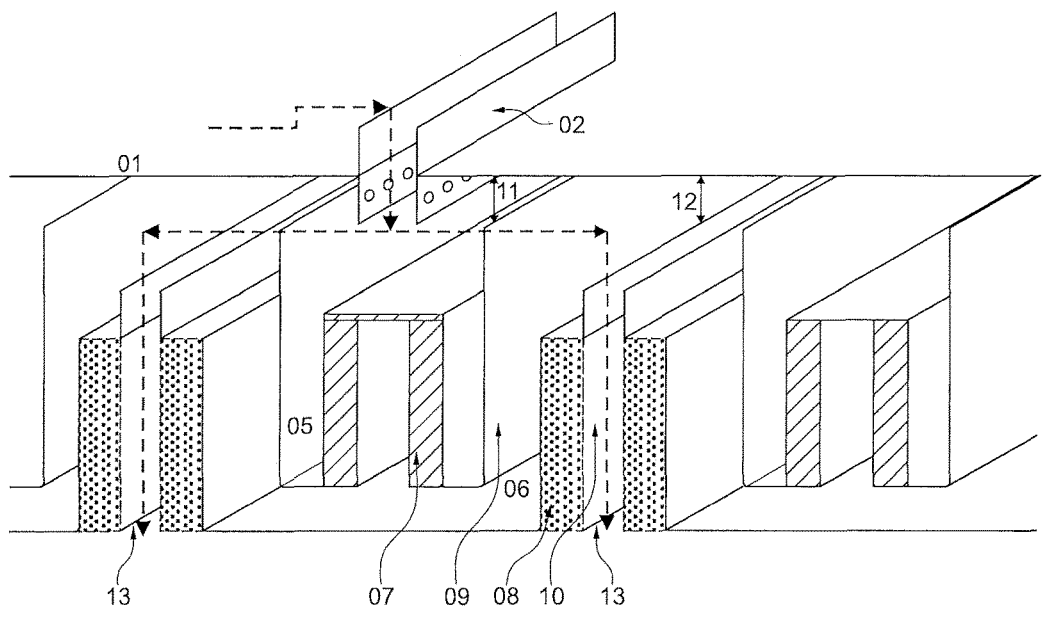
FIG. 5 shows the path of the liquid when the particle collecting capacities of both the filtering medium 1 (07) and 2 (08) are exhausted and the filtration tray has concluded its cycle length. The liquid level raises above the overfill gate 2 (09) and escapes through the slot 2 (12). Subsequently, it flows through the exit channel downstream. Particles are now still transported with the liquid.
Figure 6:
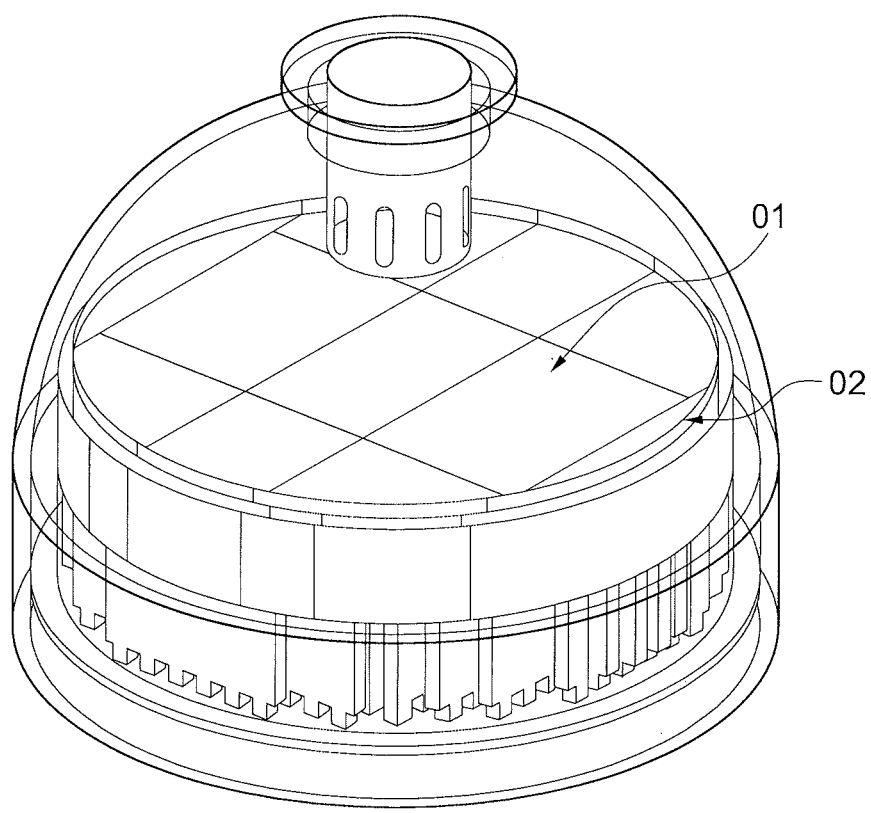
FIG. 6 shows an isometric view of the sedimentation basin 1 and sedimentation overfill gate 1 in one of the embodiment.
Figure 7:
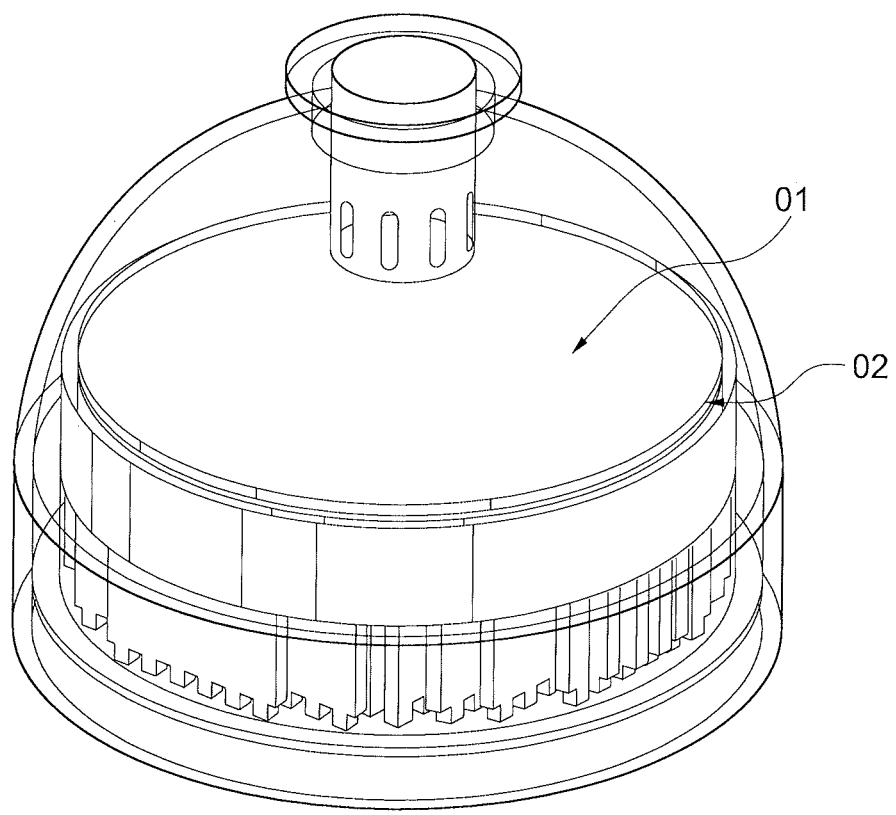
FIG. 7 shows the same of FIG. 6 with the liquid on the sedimentation basin.
Figure 8:
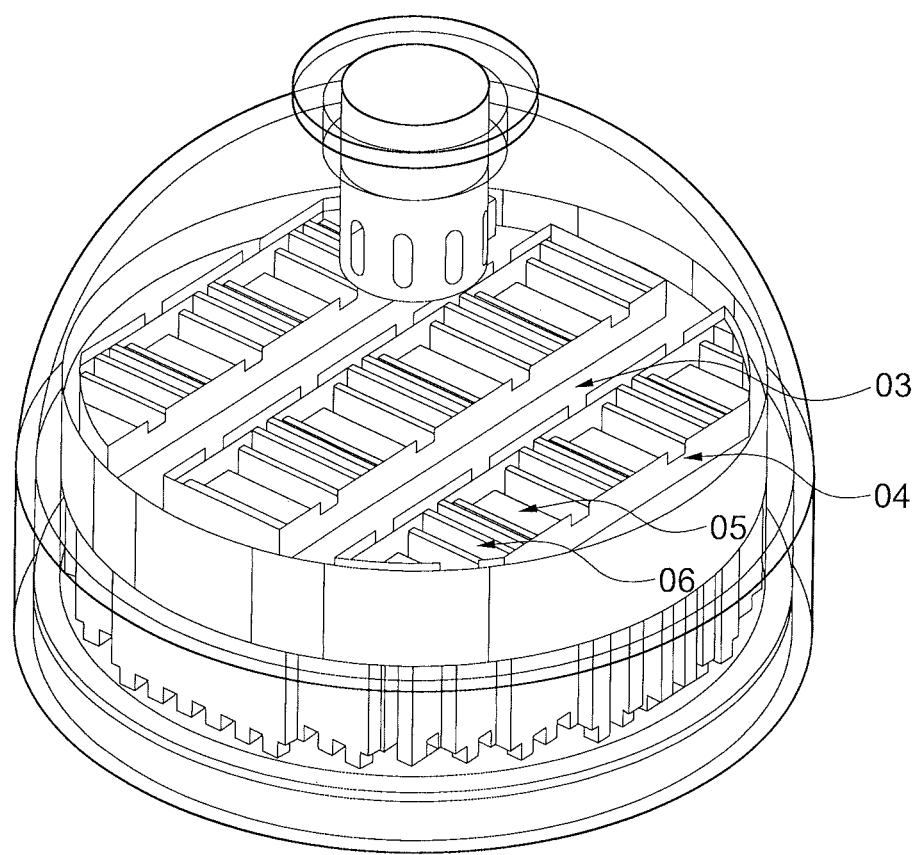
FIG. 8 shows an isometric view of the filtration section, showing one embodiment of the sedimentation basin 2 (03) the sedimentation overfill gate 2 (04) the filtration basin 1 (05) and the filtration basin 2 (06)
Figure 9:
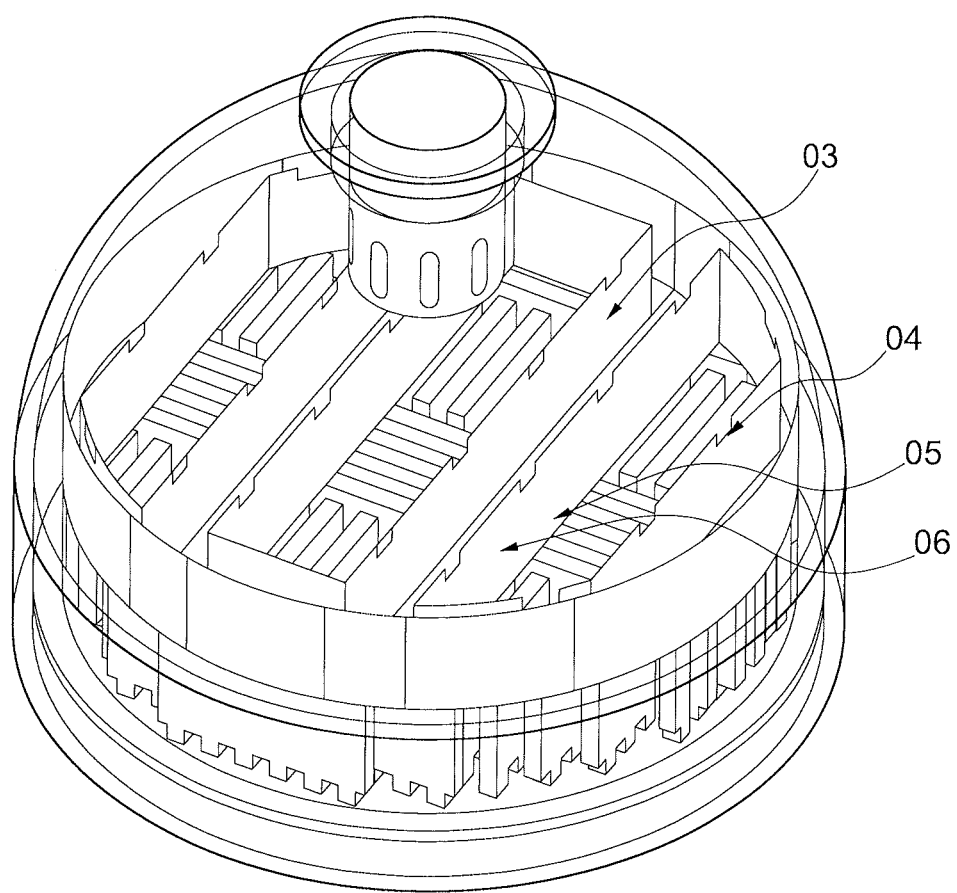
FIG. 9 shows another isometric view of the filtration section.
Figure 10:
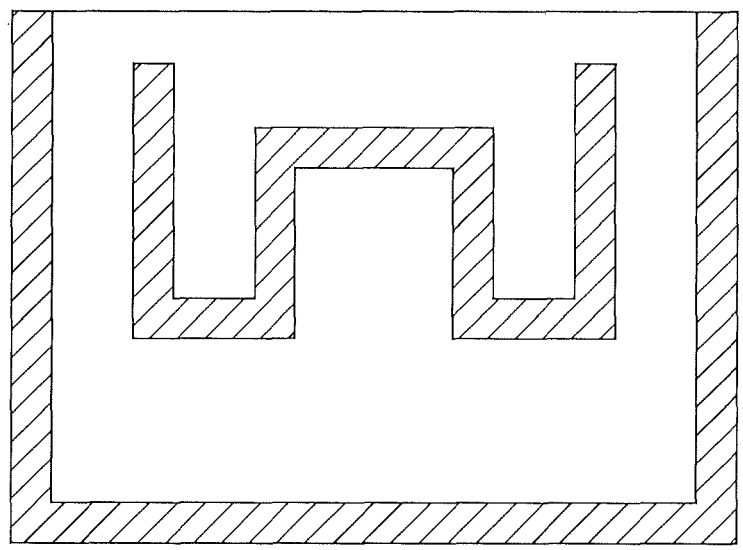
FIG. 10 shows another embodiment of the filtration media. In this embodiment there are filtration media on all walls of the filtration basins.

01 Sedimentation basin 1.
02 Sedimentation overfill gate 1
03. Sedimentation basin 2.
04 Sedimentation overfill gate 2
05. Filtration basin 1.
06. Filtration basin 2.
07. Filtering media. 1
08. Filtering media 2.
09. Overfill gate 1
10. Overfill gate 2
11. Slot 1.
12. Slot 2.
13. Exit channel

The invention claimed is:

1. A particle separation system for a catalytic chemical reactor, wherein the particle separation system comprises a plurality of filtration sections comprising overfill systems configured to enable particle capture while keeping a pressure drop over the particle separation system constant and limiting a liquid load across the particle separation system, wherein the particle separation system comprises at least one filtration tray comprising a number of basins with basin walls for collection of liquid, thereby combining sedimentation and filtration, wherein at least one of the basin walls comprises a filter medium, and wherein a plurality of the basins are interconnected in a series of upstream and downstream basins, such that an upstream basin is configured to enable liquid to permeate through the filtering medium to a downstream filtration tray or to a downstream basin until said filtering medium is plugged by accumulating particles;
wherein a liquid level of an upstream basin rises when the filtering medium progressively plugs, thereby exposing downstream basins to the liquid stream as the basin walls comprising the filter medium function as overfill gates, and
wherein an open passage downstream the overfill gate is configured to have a pressure drop which is higher than the sum of the pressure drops of all serially interconnected basins with unplugged filtering medium in a filtration tray.

2. A particle separation system according to claim 1, wherein said filtering medium comprises a composite.

3. A particle separation system according to claim 1, further comprising at least one initial sedimentation basin upstream the trays for large and heavy scale particles.

4. A particle separation system according to claim 1, wherein the trays are constructed as crates comprising at least two walls made of a screen type material.

5. A particle separation system according to claim 4, wherein the screen type material comprises catalyst or inert material, or catalyst and inert material.

6. A particle separation system according to claim 5, wherein the screen type material is adapted to allow passage of liquid, while preventing the catalyst or inert material to pass through it.

7. A particle separation system according to claim 4, wherein the two screens face each other and are oriented perpendicular to a fluid flow.

8. A particle separation system according to claim 4, wherein the crates have at least one removable side for service.

9. A particle separation system according to claim 8, wherein the removable side is fastened by means of quick releases.

10. A particle separation system according to claim 1, wherein the particle separation system is configured to allow a gas to flow from an entry point to downstream the plurality of the basins unhindered by the filter medium in the at least one basin walls.

11. A particle separation system according to claim 1, wherein the particle separation system is configured to separate substantially all gas from a feed mixture.

\* \* \* \* \*